Oct. 27, 1959   O. W. MUCKENHIRN   2,910,582
PULSE FILTER CIRCUIT
Filed May 7, 1956
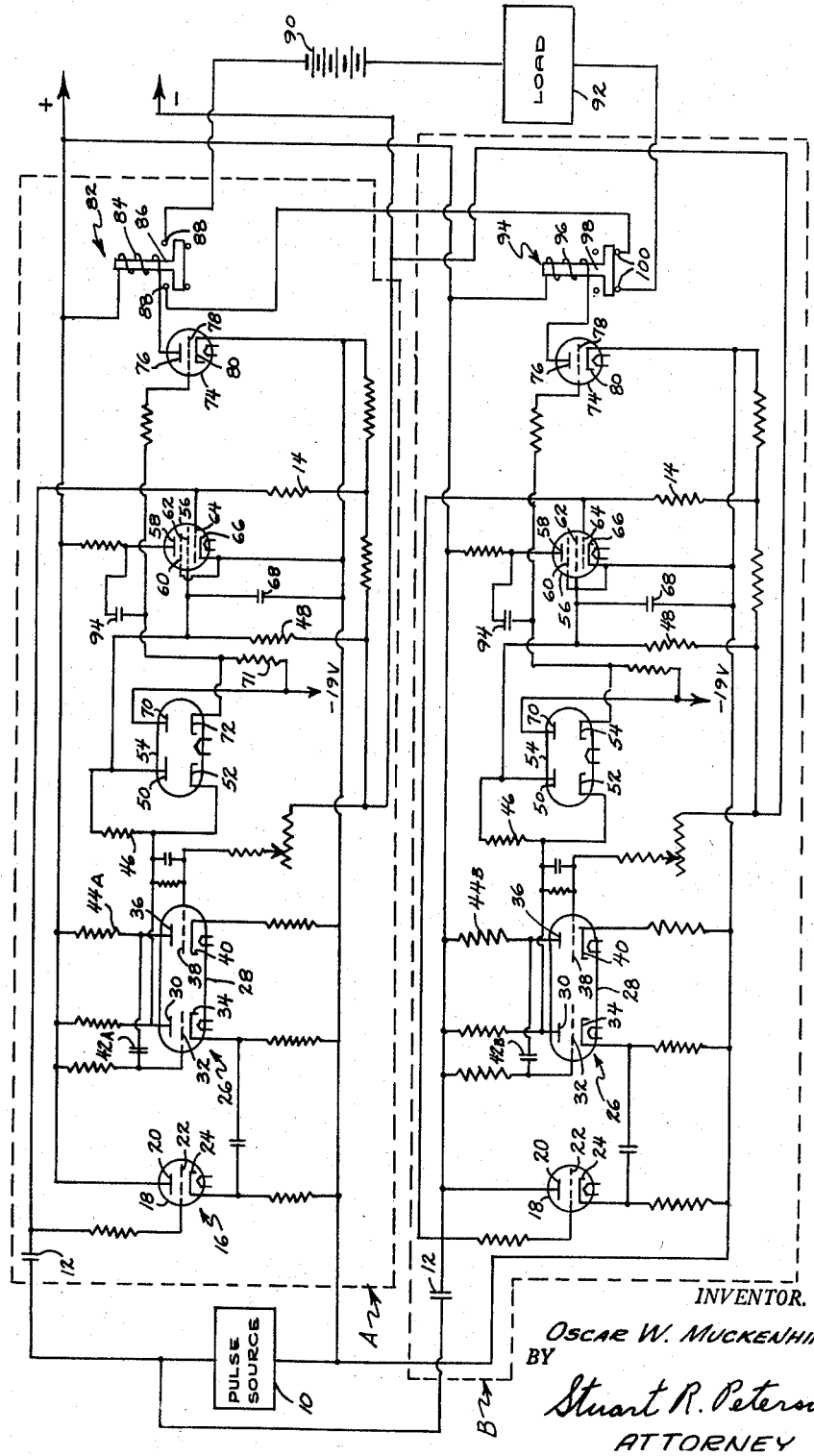
INVENTOR.
Oscar W. Muckenhirn
BY
Stuart R. Peterson
ATTORNEY Patented Oct. 27, 1959

2,910,582
PULSE FILTER CIRCUIT

Oscar W. Muckenhirn, St. Paul, Minn., assignor to General Mills, Inc., a corporation of Delaware Application May 7, 1956, Serial No. 583,199

13 Claims. (Cl. 250—27)

This invention relates generally to filter circuits and pertains more particularly to a circuit of this general character that is highly selective as to the passing of pulses of certain frequencies or repetition rates.

There are a number of situations in which it is desired to discriminate between pulse signals of various repetition rates. For example, in carrying out radiosonde operations a single radio transmitter must send out various meteorological data to a ground based receiver. In sending these signals, which are in the form of pulses having various repetition rates indicative of the information being transmitted, a motor driven rotary contactor switch located at the ground or receiving station is periodically synchronized with a similar switch borne aloft by the gondola of the balloon. To do this, a series or sequence of synchronizing or reference pulses is sent out by the transmitter whenever the switch arm of the airborne switch is in a certain rotative position. For the sake of illustration we may assume that these synchronizing signals are at a pulse repetition rate of 240 pulses per second or above and that the pulse frequency of the data conveying signals range downwardly from this 240 figure. Accordingly, under this assumed set of circumstances we would want to exclude any pulses having a frequency less than 240 p.p.s. in "zeroing" in the ground switch.

Therefore, one object of the instant invention is to provide a filter capable of distinguishing or discriminating between pulses of specified repetition rates. More particularly, it is an aim of the invention to employ gating circuitry triggered by a first pulse of a plurality or series of pulses in conjunction with further circuitry that disregards the triggering pulse but which passes subsequent pulses if they occur within the time interval determined by a specified repetition rate. This type of filtering would correspond to a low pass filter.

Another object of the invention is to provide a circuit combination that possesses band pass characteristics. In this regard, a circuit arrangement is envisaged that will reject pulses that are either above or below a particular frequency range from passing through the circuit.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing the single figure presented is a schematic diagram of a band pass pulse filter exemplifying the invention.

Referring in detail to the drawing, the circuit there depicted comprises two substantially identical circuit sections A and B, the sections differing from each other solely by reason of certain component constants, as will hereinafter become more apparent. A pulse source 10 supplies positive going pulses to both sections A and B with pulses that may be of various repetition rates, some of which must be rejected. All of the pulses produced by pulse source 10 will hereafter be referred to as signal pulses.

Assuming that it is desired to reject those signal pulses having a repetition rate of less than a predetermined value, say the 240 p.p.s. already mentioned, we need consider only the circuit section A. Inasmuch as the pulses from the source 10 may not be sufficiently peaked, these pulses are fed to differentiating circuitry composed of a capacitor 12 and a resistor 14. The resulting sharpened pulses are fed to a cathode follower designated generally by the reference numeral 16 which includes a triode 18 having a plate 20, a control grid 22 and a cathode 24. While not readily apparent from the diagram this triode may be one-half of a 12AT7 tube, the other half thereof to be referred to hereinafter.

The tube 18 delivers its output pulses to a univibrator labeled 26 including a double triode 28, such as a 12AT7 tube, having a first plate 30, first control grid 32 and first cathode 34 and a second plate 36, control grid 38 and cathode 40. The univibrator 26 of section A further includes a capacitor 42A and a resistor 44A, the constants of which are instrumental in determining how long the univibrator will remain in its quasi-stable state before returning to its stable state. Since the principle on which the univibrator 28 operates is well known, it is deemed unnecessary to elaborate further on the functioning of this portion of the circuit other than to say that the univibrator provides a gating action, the open period of which is governed principally by the capacitance and resistance values of the components 42A and 44A, respectively. Still assuming that we are interested in "passing" signal pulses having a repetitive frequency of 240 p.p.s. or greater, the components 42A, 44A will be selected so that the univibrator or "gate" 26 will be open, i.e., in its quasi-stable state, for a time interval of only 1/240 of a second. Thus while any signal pulse will trigger the univibrator 26, only a second signal pulse received from the cathode follower 16 within 1/240 of a second will be effective at the load. In other words, the first or triggering signal pulse and the second signal pulse must have a repetition rate of 240 p.p.s. or greater. Should the repetition rate be 480 p.p.s., then the second signal pulse received will have no effect on the univibrator during the open gate period of said univibrator, and the univibrator will, therefore, be triggered on just every third signal pulse. As is customary with univibrators, the univibrator 26 produces a substantially rectangular output pulse for each triggering input pulse furnished by the cathode follower 16.

The output gate pulses produced by the univibrator are fed to a voltage divider network consisting of a resistor 46 and a resistor 48. By means of a diode having a plate 50 and a cathode 52 in parallel with the resistor 46 the gate pulses from the univibrator 26 are rendered flatter in appearance, the diode, therefore, serving as a gate pulse shaper. It might be mentioned that the diode composed of the plate 50 and cathode 52 may constitute one-half of a double diode tube 54 such as a 6AL5 tube, the other half of which will be referred to later. Of course, the diodes herein described may be of the semiconductor variety having proper characteristics, if desired.

After being appropriately shaped, the rectangular gate pulses are delivered to the screen grid of a pentode tube 56. This pentode, which may be a 6AU6 tube, includes a plate 58, supressor grid 60, screen grid 62, control grid 64 and cathode 66. It will be observed from the schematic drawing that a capacitor 68 is connected in parallel with the screen grid 62 and the cathode 66 of the pentode 56. The purpose of the capacitor 68 is to provide a gate pulse wave front rising exponentially and thereby increasing the rise time beyond the time width of the triggering signal pulses. This gate pulse that has been generated by the univibrator 26 and reshaped by capacitor 68 is delivered to screen grid 62. Thus while the capacitor 68 slopes the front portion of the gate pulse being fed to the screen grid 62, the diode portion including the plate 50 and the cathode 52 functions to provide a relatively sharp cut-off or small decay time on the rear edge of this same screen grid gate pulse.

From the depicted circuitry it is also to be noted at this time that the same signal pulse that triggered the univibrator 26 is also applied to the control grid 64 of the pentode 56. However, since the gate pulse delivered to the screen grid 62 has a sloping approach portion as indicated in the above paragraph, this screen gate pulse prevents the pentode 56 from conducting on the signal pulse that triggered the univibrator 26. On the other hand, when the univibrator 26 is subjected to multiple triggering, that is, receiving subsequent signal pulses of a series or sequence, all the signal pulses fed to the univibrator after the one which triggers each operation cause the univibrator to conduct and a signal pulse for each subsequent input pulse is fed to the plate 50 of the tube 54 if the subsequent signal pulse or pulses are received in rapid enough succession. In this regard, it will be recalled that the function of the plate 50 together with its cathode 52 is to appropriately shape the gate pulses from the univibrator. More specifically, the aforesaid plate 50 and cathode 52 are to provide a sharp cut-off on the rear edge of the gate pulses which are to be applied to the screen grid 62.

The tube 54, illustratively a double diode tube as previously mentioned, further includes a plate 70 and a cathode 72, this plate and cathode serving as a diode clamp, and associated with the diode formed by the plate 70 and the cathode 72 is a triode 74 containing a plate 76, a control grid 78, and a cathode 80. Actually this last-mentioned triode 74 may be the other half of the double triode tube embracing the tube 18 which was mentioned hereinbefore. The control grid 78 of the triode 74 is connected to the cathode 72 and the tube 74 is cut off until the clamped output of the diode consisting of the plate 70 and cathode 72 overcomes the negative bias applied to the grid 78, thereby allowing the tube 74 to conduct. More will be said presently concerning the specific operation and the circuit components performing this operation relative to the conducting of the tube 74. However, at this time it is to be discerned that the tube 74 has a load means included in its plate circuit in the form of a relay or electronic trigger circuit which would cause a circuit to be closed or become conducting so long as and only when triode 74 itself conducts sufficiently. In the figure, this operation is illustrated only for mechanical type relay operation but it is the intention of this invention to include in place of the relay any electronic trigger circuit that may be required for higher frequency or pulse repetition rates. The relay herein selected is designated generally by the reference numeral 82, this relay including a coil 84 which is the element actually in the plate circuit and an armature 86 actuatable by energization of the coil 84 when the triode 64 conducts sufficiently. The relay 82 includes a pair of normally open contacts 88 which are effectively bridged by the armature 86 when it is attracted upwardly through the energization of the coil 84. In circuit with the contacts 88 is a source of power 90 and a load 92. Inasmuch as the over-all circuitry comprised of sections A and B is intended to perform a band pass filter function as far as the load 92 is concerned, in addition to the present type of operation, more will be said about the load 92.

At this time attention is directed back to the plate circuitry of the pentode 56. In this regard it is to be observed that a capacitor 94 is connected between plate 58 and the cathode 72. It is by reason of the capacitor 94 that when the pentode 56 conducts, as it will when there is a coincidence of pulses occurring on the screen grid 62 and the control grid 64, the diode formed by the plate 70 and the cathode 72 fires or conducts abruptly so as to modify the negative bias normally applied to the control grid 78 in the following manner. The signal pulses, except for the triggering ones, from the source 10 arriving at the control grid 64 during any period that a gate pulse from the univibrator is applied to the screen 62 cause pentode 56 to conduct during the signal pulse interval, this conduction causing plate 58 to drop in potential thereby driving grid 78 of triode 74 more negative by virtue of capacitor 94. At the same cathode 72 of diode 54 is driven correspondingly negative allowing diode 54 to conduct between plate 70 and cathode 72 and thereby reduce the potential difference across capacitor 94 from its value before tube 56 conducted. At the termination of the short signal pulse the potential of the plate 58 of pentode 56 rises and by virtue of capacitor 94 also causes grid 78 and cathode 72 to rise causing the diode to cease conducting and triode 74 to conduct. Resistor 71 which is now in series with capacitor 94 prevents capacitor 94 from changing its voltage rapidly and consequently causes triode 74 to conduct for a relatively long period. Thus by means of the diode 54 clamping action, it has been possible to increase the conduction time of triode 74 over the conduction time had the signal pulse alone been used. Thus the conducting of the pentode 56 is directly responsible for the concomitant conduction of the tube 74 and hence the actuation of the relay 82 or electronic trigger.

However it must be fully appreciated that the signal pulse from the cathode follower 16 which is delivered to the univibrator 26 to trigger the univibrator will have a sloping wave front as produced by the capacitor 68. Hence the particular signal pulse that initiates or triggers the univibrator 26 will not cause the pentode to conduct because its screen voltage has not risen sufficiently. In this way only a subsequent signal pulse arriving at control grid 56 (after the univibrator has been actuated into a quasi-stable state to produce a gate pulse) will be instrumental in energizing the relay 82 (or electronic trigger, if used). If the gate pulse to the screen grid 62 is of sufficient magnitude at the same time that a signal pulse occurs at the control grid 64, the two pulses applied to the grids 62 and 64 act in concert so as to cause an output pulse to be produced by the pentode 56. It is this output pulse that causes the tube 74 to conduct. Without such an output pulse from the tube 56 there can be no conduction of the tube 74 and hence no energization of the relay 82.

From the above description it can be appreciated, it is believed, that a signal pulse repetition rate of less than 240 p.p.s. will not cause triode 74 to conduct, for under the conditions we have assumed the interval between signal pulses will be too great. However, if the second or subsequent signal pulse comes withing $\frac{1}{240}$ of a second, it will result in the triode 74 conducting and thereby energizing the relay 82.

While in many instances the employment of only the circuit section A will be adequate for the desired purpose, nonetheless it is envisaged that the circuitry constituting both the sections A and B be used for band pass filter functions. Therefore the section B is a substantial duplicate of the section A, differing therefrom by a change in the circuit constants which are intended to change the gating period of the univibrator 26 belonging to the circuit section B. For instance, if we wanted to exclude pulse frequencies of less than 240 p.p.s., the section A performs this particular role whereas the section B is responsible for excluding any effect from pulse frequencies above a predetermined value, as will presently be explained. For instance, we may assume for the sake of discussion that we are desirous of preventing pulse repetition rates of 480 p.p.s. and above from energizing the load 92. When this is desired, then the univibrator 26 of the section B will have a capacitance for its capacitor 42 and a resistance for its resistor 44 of such a value that the univibrator will be held or gated open for 1/480 of a second and any signal pulses having a repetitive rate greater than 480 p.p.s. will be effective in operating the relay (referred to below) of this section B in a manner corresponding to that described above for section A.

Cooperating with the univibrator 26 of the circuit section B is a second relay 94 (or second electronic trigger) comprising a coil 96 and an armature 98. The relay 94 includes a pair of normally closed contacts 100, these contacts 100 being in a serial relation with the normally open contacts 88 of the relay 82 and of course the source of power 90 and the load 92. Consequently when the univibrator 26 of the circuit section B is effective as far as putting out a gate pulse, a second signal pulse, together with said gate pulse, will cause conduction of the pentode 56 of the circuit section B, resulting in the triode 74 of this circuit section B conducting and thus energizing the coil 96. Energization of the coil 96 will pick up or attract the armature 98 to open the normally closed contacts 100. Therefore while relay 82 will be energized so as to close its contacts 88 for any frequencies above 240 p.p.s., nonetheless the relay 94 will be energized when such a signal pulse frequency reaches a value of 480 p.p.s. In this way, the circuit section A excludes signal pulse repetition rates below 240 p.p.s. and the circuit section B literally prevents load action by signal pulses having a repetition rate greater than 480 p.p.s. Of course signal pulses of various repetition rates may be utilized to produce the upper and lower limits of the band pass range, the two repetition rates mentioned being only illustrative.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A filter circuit of the class described comprising a univibrator, means for triggering said univibrator upon receipt of a first signal pulse from a given source to initiate an open gate period and provide an output pulse, means associated with said univibrator for maintaining the open gate period for a predetermined time so as to produce a gate pulse from said univibrator and a tube including a pair of grid elements, one of said grid elements being connected to said univibrator so as to receive said output gate pulse therefrom and the other grid element being connected for receipt of the same signal pulse that is applied to said univibrator, and means for modifying the characteristics of said output pulse so that the cumulative bias applied to said grid elements is insufficient to cause said tube to conduct, whereby application of a second pulse from said source of sufficient magnitude to said other grid element at the same time that said output pulse is provided will cause said tube to conduct.

2. A filter circuit of the class described comprising a univibrator having a stable state and a quasi-stable state, means for feeding successive signal pulses to said univibrator from a given source, means in circuit with the univibrator for triggering said univibrator to change it from its stable state condition to its quasi-stable state upon receipt of a first signal pulse from said source, means for maintaining the univibrator in its quasi-stable state for a predetermined interval of time, said univibrator producing a gate pulse for said first signal pulse, a multigrid tube having a first grid connected so as to have applied thereto the gate pulse from said univibrator and a second grid connected so as to have applied thereto said signal pulses from said source, and means for modifying said gate pulse so that the gate pulse and said first signal pulse will not cause said multigrid tube to conduct, whereby only a signal pulse subsequent to said first signal pulse together with said gate pulse will cause said multigrid tube to conduct.

3. A filter circuit in accordance with claim 2 in which said modifying means includes a capacitor for sloping the wave front of the gate pulse delivered to said first grid.

4. A filter circuit in accordance with claim 2 including means for producing a sharp cut-off on the rear edge of the gate pulse.

5. A filter circuit of the class described comprising resistance and capacitance means for differentiating a series of signal pulses, a cathode follower including a triode tube having a plate, control grid and cathode, a univibrator including first and second triodes each having a plate, control grid and cathode, the cathode of said first triode being connected to the cathode of said cathode follower, a capacitor connected between the plate of said second triode and the grid of said first triode, a voltage divider network including a pair of resistors in series, one of said resistors being connected to the plate of said first triode, a first triode having a plate connected to the junction of said resistors and a cathode connected to the plate of said first triode to thereby parallel said one resistor, a pentode including a plate, suppressor grid, screen grid, control grid and a cathode, said screen grid being connected to the junction of said resistors, a capacitor connected between said screen grid and said pentode cathode for sloping the wave front on the gate pulse delivered from the univibrator to said screen grid, a second diode having a plate and cathode, and a triode including a plate, control grid and cathode, the grid of said last mentioned triode being connected to the cathode of said second diode, resistance and capacitance means in circuit between the plates of said second diode and said pentode, the cathode of said second diode being connected to the junction of said last-mentioned resistance and capacitance means, and load means in circuit with the plate and cathode of said last-mentioned triode.

6. A filter circuit of the class described comprising a univibrator having a stable state and a quasi-stable state, means for feeding successive signal pulses to said univibrator from a single source, means in circuit with the univibrator for triggering said univibrator to change it from its stable state condition to its quasi-stable state upon receipt of a first signal pulse, means for maintaining the univibrator in its quasi-stable state for a predetermined interval of time, said univibrator producing a gate pulse upon receipt of said first signal pulse, a tube having a plate, a pair of grids and a cathode, one of said grids being connected so as to have applied thereto the gate pulses from said univibrator and the other grid being connected so as to have applied thereto said signal pulses, means for modifying said gate pulses so that the gate pulse produced by the first signal pulse and said first signal pulse will not cause said tube to conduct, whereby only a signal pulse subsequent to said first signal pulse in concert with a gate pulse will cause said tube to conduct, a triode having connected in its grid the plate circuit of said tube, and a relay connected in the plate circuit of said triode.

7. A filter circuit having band pass characteristics comprising from a single pulse source, means for differentiating a series of signal pulses from said pulse source, a pair of cathode followers connected to said differentiating means, a univibrator connected to each cathode follower, a gate pulse shaper connected to each univibrator for sloping the wave fronts of the pulses produced by said univibrator, a diode clamp connected to each of said pulse shapers, a pentode tube associated with each univibrator including a control grid connected to said differentiating means and a screen grid connected to its associated univibrator, and load means operable by said pentode tube.

8. A filter circuit having band pass characteristics comprising a pair of univibrators each having a stable state and a quasi-stable state, means for feeding successive signal pulses to said univibrators from the same source, means in circuit with each univibrator for triggering its univibrator to change it from its stable state condition to its quasi-stable state upon receipt of a first signal pulse, means for maintaining each of the univibrators in their respective stable states for different predetermined intervals of time, said univibrators each producing a gate pulse upon receipt of a first signal pulse, a multigrid tube associated with each univibrator having a first grid connected so as to have applied thereto the output pulses from its associated univibrator and a second grid connected so as to have applied thereto said signal pulses, and respective means for modifying the gate pulses from said univibrators so that the gate pulse produced by the triggering signal pulse for each univibrator and said first signal pulse will not cause the multigrid tubes to conduct, whereby only a signal pulse subsequent to said first signal pulse together with said respective gate pulses will cause said multigrid tubes to conduct.

9. A filter circuit in accordance with claim 8 in which a triode is associated with each multigrid tube having its grid conected in the plate of the multigrid tube with which it is associated and a relay connected in the plate circuit of each triode.

10. A filter circuit in accordance with claim 9 in which one of said relays has normally open contacts and the other of said relays has normally closed contacts whereby the relay with said normally open contacts is energized when the input pulses are of a lower frequency and the relay with said normally closed contacts is energized when the input pulses are at a higher frequency.

11. A filter circuit of the class described comprising a single pulse source for supplying first and second pulses, gate means for receiving said first pulse to produce an output pulse having a predetermined time duration, means for delaying the building up of said output pulse to a prescribed value, and coincidence means associated with both said pulse source and said gate means for receiving said first and second pulses via one course and said output pulse via another course, the cumulative effect of said first pulse and said output pulse owing to its delayed build up being insufficient to produce an output signal from said coincidence means and the cumulative effect of said second pulse and said output pulse if still prevailing being sufficient to produce an output signal from said coincidence means.

12. A filter circuit of the class described comprising a single source of a series of signal pulses, normally closed gate means, means for triggering said gate means upon receeipt of each signal pulse to produce a gate pulse of a prescribed width for each signal pulse so received, a multigrid tube having one grid in circuit with said gate means and a second grid for receiving said signal pulse, and means intermediate said gate means and said one grid for sloping the wave front of each gate pulse so that the pulses impressed upon said grids from said first signal pulse will not cause conduction of said tube but cause conduction if a second signal pulse is impressed on said second grid during the time that the first gate pulse persists.

13. A filter circuit having band pass characteristics comprising a pair of respective gate means having different unstable periods of operation, means for triggering each gate means upon receipt of a first signal pulse of a series of signal pulses from a given source to produce a gate pulse of different prescribed widths from each gate means, a multigrid tube associated with each gate means having one grid thereof in circuit with its associated gate means and a second grid for receiving said signal pulses, and respective means intermediate each gate means and the one grid associated therewith for sloping the wave front of the gate pulses so that the respective gate pulses produced by said first signal pulse will not cause conduction of said tubes but cause conduction of either tube if a second signal pulse is impressed on the second grids during the time that the first gate pulses persist.

References Cited in the file of this patent

UNITED STATES PATENTS

| | | |
|---|---|---|
| 2,482,544 | Jacobsen | Sept. 20, 1949 |
| 2,577,827 | Tompkins | Dec. 11, 1951 |
| 2,596,956 | Nierman | May 13, 1952 |
| 2,605,408 | Millman | July 29, 1952 |
| 2,651,753 | Buyer | Sept. 8, 1953 |
| 2,700,731 | Crayford | Jan. 25, 1955 |
| 2,710,958 | Sallach | June 14, 1955 |
| 2,767,315 | Kosten | Oct. 16, 1956 |

FOREIGN PATENTS

| | | |
|---|---|---|
| 643,471 | Great Britain | Sept. 20, 1950 |

UNITED STATES PATENT OFFICE

CERTIFICATE OF CORRECTION

Patent No. 2,910,582                                             October 27, 1959

Oscar W. Muckenhirn

It is hereby certified that error appears in the printed specification of the above numbered patent requiring correction and that the said Letters Patent should read as corrected below.

Column 4, line 12, after "same" insert -- time --; column 7, line 2, for "univibrator" read -- univibrators --.

Signed and sealed this 2nd day of August 1960.

(SEAL)
Attest:
KARL H. AXLINE
Attesting Officer

ROBERT C. WATSON
Commissioner of Patents